F. GOFF.
CONTROLLER FOR ELECTROPNEUMATIC BRAKE APPARATUS.
APPLICATION FILED APR. 18, 1917. RENEWED OCT. 2, 1919.
1,339,754.
Patented May 11, 1920.
2 SHEETS—SHEET 1.
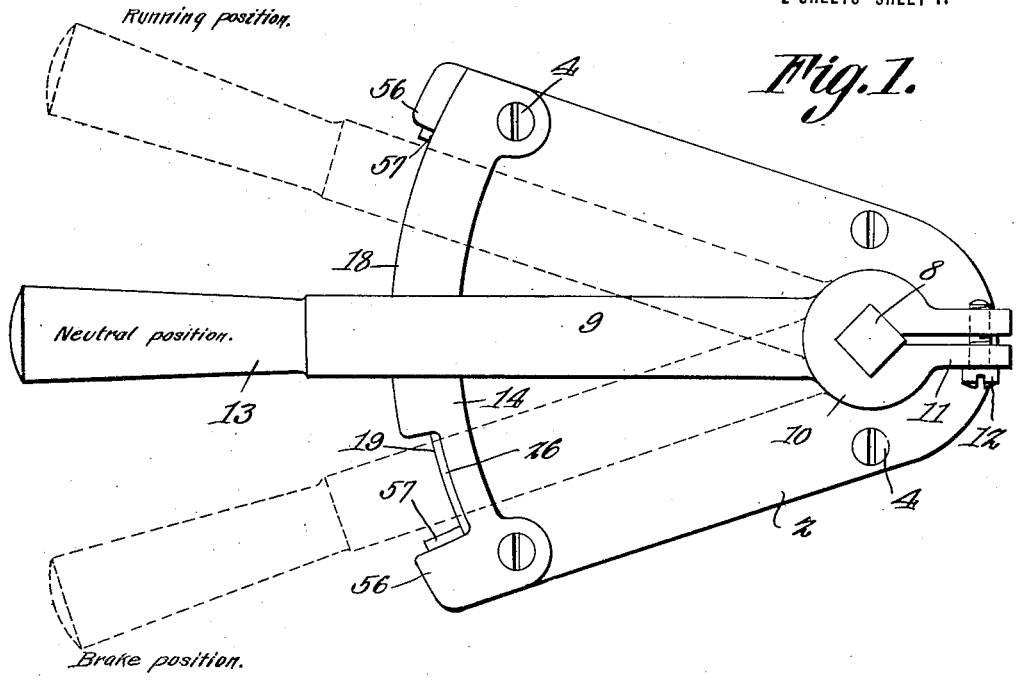
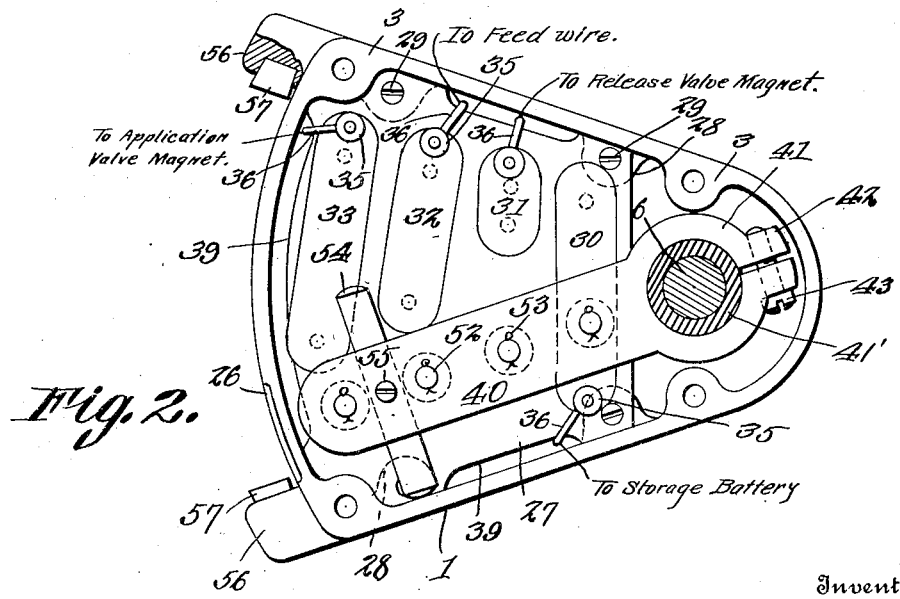
Inventor,
Frank Goff
By C. A. Snow & Co.
Attorneys.
Witness F. GOFF.
CONTROLLER FOR ELECTROPNEUMATIC BRAKE APPARATUS.
APPLICATION FILED APR. 18, 1917. RENEWED OCT. 2, 1919.
1,339,754.
Patented May 11, 1920.
2 SHEETS—SHEET 2.
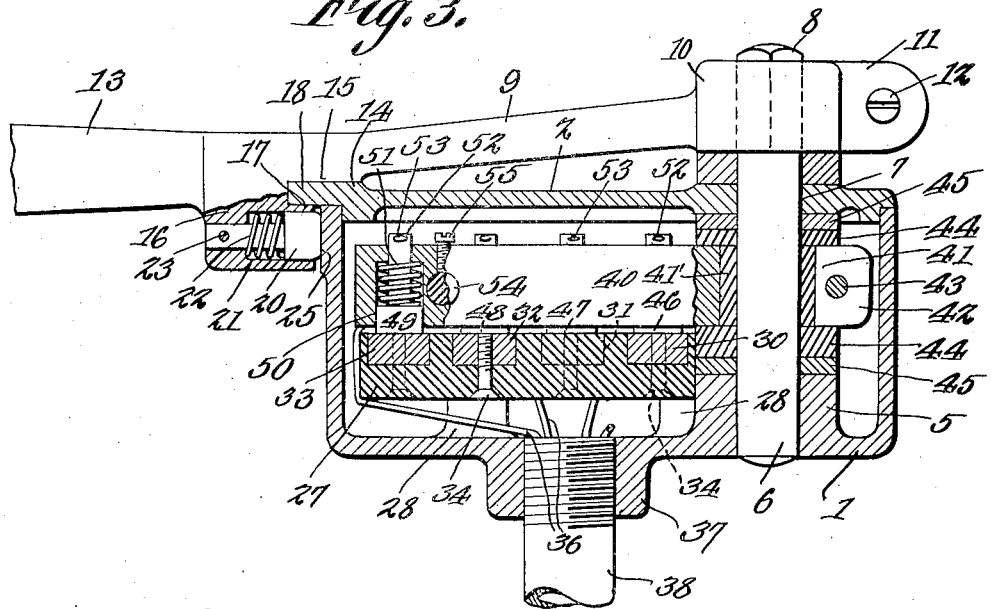
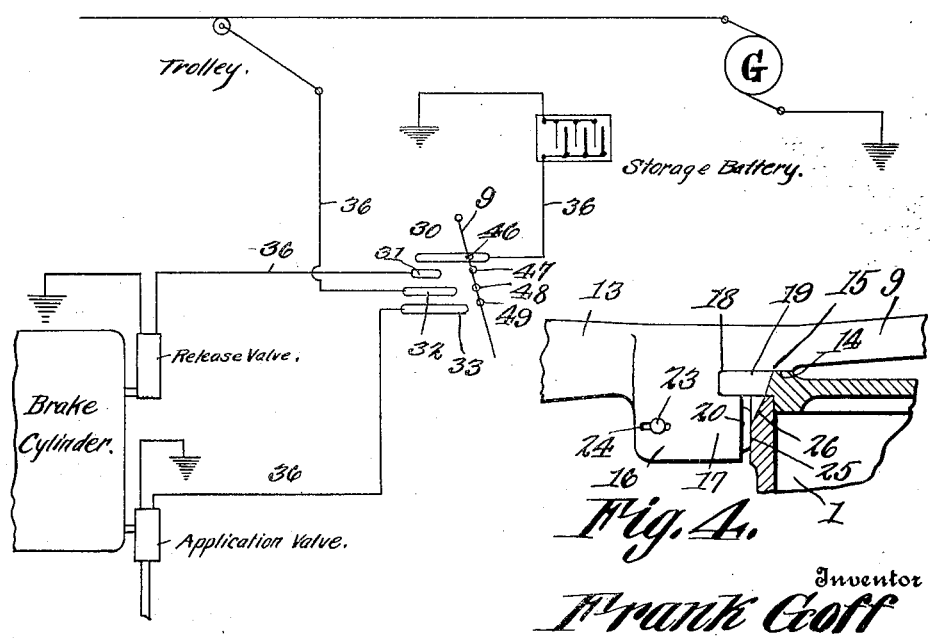
Inventor
Frank Goff

UNITED STATES PATENT OFFICE.

FRANK GOFF, OF CAMDEN, NEW JERSEY.

CONTROLLER FOR ELECTROPNEUMATIC BRAKE APPARATUS.

1,339,754.    Specification of Letters Patent.    Patented May 11, 1920.

Application filed April 18, 1917, Serial No. 163,057. Renewed October 2, 1919. Serial No. 328,084.

*To all whom it may concern:*

Be it known that I, FRANK GOFF, a citizen of the United States, residing at Camden, in the county of Camden and State of New Jersey, have invented a new and useful Controller for Electropneumatic Brake Apparatus, of which the following is a specification.

The present invention relates to electric controllers and switches, and aims to provide a novel and improved device of that character adapted especially for use in the electropneumatic systems disclosed in my co-pending applications Serial Nos. 82,431, and 115,621, filed March 6, and August 18, 1916, respectively.

It is the object of the invention to provide a controller or switch of such construction that it will operate smoothly and easily, without having a jerking motion, and which will have a long life, the working parts being inclosed and being constructed to resist wear and tear.

Another object of the invention is the provision of a controller of such construction that the handle lever can only be removed when it is swung to application position to apply the brakes, whereby when the motorman or engineer leaves the cab or vestibule, taking the handle lever with him, this will leave the brakes applied to avoid the accidental or premature movement of the car or locomotive.

The invention also contemplates the provision of a controller or switch wherein the component elements are assembled in a novel and efficacious manner, to enhance the utility and efficiency of the device.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

The invention is illustrated in the accompanying drawings, wherein:—

Figure 1 is a plan view of the improved controller.

Fig. 2 is a similar view with the cover and handle lever removed and portions shown in section.

Fig. 3 is a longitudinal section on the line 3—3 of Fig. 1.

Fig. 4 is a sectional detail on the line 4—4 of Fig. 2.

Fig. 5 is a diagrammatical view illustrating the controller and circuits controlled thereby.

The controller embodies a casing or receptacle 1 constructed of suitable metal and of sector or substantially triangular shape, and having a similarly shaped cover 2. The rim of the casing 1 is provided with lugs 3 having threaded apertures for the engagement of securing screws 4 engaged downwardly through the cover 2, to hold the cover in place. The bottom of the casing 1 is provided at its narrow end with an upstanding boss or bearing 5 in which is journaled the lower end of a rock shaft 6 which extends upwardly through and is journaled within an opening 7 in the cover 2. The upper protruding end of the shaft 6 is squared or of non-circular cross section, as at 8, for the engagement of the handle lever 9 that extends over the cover 2. The lever 9 is provided at one end with a split attaching portion or collar 10 having the outstanding ears 11 connected by a clamping screw 12. By adjusting the screw 12, the collar 10 can be adjusted to take up wear, whereby the collar will slip snugly onto the end portion 8, or the screw 12 can be tightened to clamp the collar on the rock shaft when this is desired. The lever 9 projects beyond the wider arcuate end of the casing and is provided at its free end with a suitable handle 13 whereby the lever can be conveniently oscillated. The wider end of the cover 2 is provided with a raised arcuate abutment 14, and the lever 9 is provided between its ends with a downwardly facing surface 15 bearing snugly upon the abutment 14, to support the lever for swinging movement, and to prevent the depression thereof by the hand which grips the handle 13.

In order to prevent the too easy movement of the lever and to prevent the removal thereof unless it is swung to the right, as illustrated, to application or brake position, the lever 9 is provided adjacent to the surface 15 with a depending hook-shaped lug 16 having the free portion 17 projecting toward the wider end of the casing and fitting snugly under a flange or lip 18 projecting from the wider end of the cover 2. The flange 18 is cut away at one end, as at 19, for the passage of the portion 17 when the lever is swung to brake position. A friction plunger 20 is slidable within a bore 21 with which the lug 16 is provided, and is projected from the portion 17 by means of a coiled wire expansion spring 22 housed within the bore 21 between the shoulder thereof and the shoulder of the plunger 20, said plunger having a reduced portion extending through the spring and carrying a pin or lug 23 working within a slot 24 of the lug 16 to prevent the plunger 20 from dropping out of the bore 21 when the handle is removed. The wider end of the casing is provided adjacent to the edge thereof with a curved abutment 25 against which the plunger 20 bears frictionally under the tension of the spring 22, whereby to frictionally retard the lever and prevent the too easy swinging movement thereof, but to enable the lever to be swung with a smooth or uniform movement, without the necessity of jerking the lever or unduly straining the parts. The abutment 25 is beveled, as at 26, below the cut away portion 19, whereby when the lever 9 is slipped downwardly into engagement with the shaft 6, to move the lug 16 downwardly through the cut away portion or notch 19, the plunger or friction detent 20 in engaging the bevel 26 will be forced against the tension of the spring 22 into proper engagement with the abutment 25. Then when the lever is swung toward the left away from brake position, the hook-shaped lug 16 will be brought under the flange or lip 18, to prevent the lever being lifted from the casing without first returning it to brake position.

The circuit interrupting and closing means is housed within the casing and includes a plate or slab 27 of fiber or other insulating material seated upon the lugs or bosses 28 integral with the bottom and side walls of the casing, and fastened upon said bosses by means of screws 29 or other securing elements extending downwardly through the plate or shelf and engaging into said bosses. The plate 27 is thus supported above and spaced from the bottom of the casing, as seen in Fig. 3, and contact strips 30, 31, 32, and 33 of brass or other suitable material are embedded in the plate 27 flush with the upper surface thereof and transversely within the casing, said strips being of different lengths as seen in Fig. 2. Said strips are firmly held in place by means of holding screws 34 extending upwardly within the plate 27 and into said strips from below. The strips are provided at certain ends with binding posts 35 to which the conductors or wires 36 are connected, said conductors extending downwardly from the binding posts underneath the plate 27 into the space between said plate and bottom of the casing. The bottom of the casing is provided with a centrally arranged boss 37 adapted to be threaded or otherwise engaged to the end of a pipe or tube 39 for housing the conductors which extend from the casing through the boss 37 into the pipe 38. The edges of the plate 27 are cut away, as at 39, for the downward passage of the conductors from above past the edges of the plate below the same.

Secured to the shaft 6 within the casing between the cover 2 and plate 27 is a switch arm 40 provided at one end with a split clamp 41 embracing an insulating bushing or sleeve 41' fitted upon the shaft 6, said clamp having the ears 42 connected by a clamping screw 43. When the lever 9 is moved to brake position for removing it, this will move the arm 40 to the same position, as seen in Fig. 2, whereby when the lever 9 is again applied, it will coincide in position with the switch arm 40, thus assuring of the proper relative position of the lever and switch arm, the switch arm remaining in brake position until the lever is again applied and swung. The arm 40 extends from the shaft 6 over the insulating plate or shelf 27, and the clamp 41 thereof is disposed between insulating washers 44 mounted upon the shaft 6, metallic washers 45 being preferably disposed between the washers 44 and the boss 5 and cover of the casing. Contact plungers 46, 47 48 and 49 are slidable within bores 50 with which the arm 40 is provided, said bores being disposed vertically at longitudinally spaced points of the arm, and the plungers being projected from the lower surface of the arm by means of coiled wire expansion springs 51 within the bores 50 and confined between the shoulders of the plungers and the bores. The plungers have reduced portions 52 extending upwardly through the springs and protruding from the upper surface of the arm, the upper protruding ends of said reduced portions or stems 52 having pins or retaining elements 53 adapted to bear upon the upper surface of the arm 40 for limiting the downward movement of the plungers. Said plungers are held by spring pressure upon the plate 27 and contact strips embedded therein, thereby providing a snug engagement of the plungers with the contact strips. The plungers 46, 47, 48 and 49 are engageable with the respective contact strips 30, 31, 32 and 33.

A transverse stop 54 of insulating material is engaged through the switch arm 40 near its free end and is held in place by means of a set screw 55 or otherwise, to strike the sides of the casing for limiting the oscillatory movement of the switch arm therein. The wider end of the casing is also provided at the ends of the abutment 25 with outstanding stop lugs 56 having the buffers 57 of leather or other suitable material embedded in their adjacent sides to be struck by the lug 16 when the lever 9 is swung to the ends of its movement, whereby to cushion the lever.

The contact strips of the plate or shelf 27 are so arranged, that the plunger 46 continually engages the strip 30, while the plungers 48 and 49 engage the respective strips 32 and 33 when the switch lever is in running or neutral position or at any position between said positions. The strip 31 is only engaged by the plunger 47 when the lever is swung to running position. The circuits are shown in their simplest form in Fig. 5, the contact strips 30, 31, 32 and 33 being connected by their respective conductors 36 with the storage battery, release valve, trolley or other feed or supply conductor and application valve, respectively. The plungers of the switch arm 40 being in metallic engagement with said arm will be electrically connected, and the plunger 46 in continually engaging the strip 30 will connect all of the plungers at all times with the storage battery. The release and application valves are magnetically controlled, as disclosed in said applications, whereby when the lever 9 is swung to brake position, as seen in Figs. 2 and 5, the circuits of the release and application valves are opened, thereby applying the brakes. When the lever 9 is swung to neutral position, the feed or supply conductor will be connected with the storage battery for supplying electrical energy thereto, and furthermore, the plunger 49 in engaging the strip 33 will close the circuit of the application valve whereby said valve will be closed. By swinging the lever 9 farther to engage the plunger 47 with the strip 31, the release valve circuit will be closed whereby to open said release valve and permit the pressure fluid to escape whereby to release the brakes. Thus, when the lever is in running or release position, the application valve will be closed and the release valve open. To apply the brakes, the lever 9 is swung toward the right to brake position, thereby removing the plungers 47, 48 and 49 from their contact strips and opening the respective circuits, resulting in the release valve being closed and the application valve being opened, which will apply the brakes as will be understood. To apply the brakes gradually or step by step, the lever 9 is oscillated between neutral and brake position. Thus, when the lever is moved to brake position, the application valve is opened, and when it is returned to neutral position, the application valve is closed, thus opening and closing the application valve alternately, to provide a service application of the brakes. By returning the lever to running position, the application valve is closed and the release valve opened, and the brakes can be gradually released for oscillating the lever 9 between running and neutral position, since when the lever is returned to neutral position, the release valve will be closed, thereby resulting in the release valve being alternately opened and closed as the lever is oscillated, between running and neutral position. The magnets of the release and application valves are energized normally when the lever is in running position, thereby keeping said valves heated during cold weather, so that they will operate properly.

Having thus described the invention, what is claimed as new is:—

1. A controller embodying a casing having a flange and a curved abutment underneath said flange, a rock shaft journaled within the casing, a switch arm carried by the rock shaft within the casing, a handle lever engaged with the shaft outside of the casing and extending across said flange, the lever having a hook-shaped lug engageable with said flange to prevent the removal of the lever excepting when swung to one position, and a spring pressed friction member carried by said lug to bear against said abutment.

2. A controller embodying a casing having a cover, a rock shaft journaled within the casing and extending through the cover, a switch arm carried by the shaft within the casing, a handle lever engageable detachably with the shaft above the cover, the cover having an arcuate flange at one end provided with a cut away portion, the casing having an arcuate abutment below said flange and provided with a beveled portion below the cut away portion, the lever having a hook-shaped lug movable through said cut away portion in one position of the lever and engageable with said flange to prevent the removal of the lever in its other positions, and a spring pressed friction member carried by said lug engageable with said abutment and guided into engagement therewith by said beveled portion when the lug is moved through the cut away portion to engage the flange.

3. A controller embodying a casing, a rock shaft journaled therein, a handle lever connected to the rock shaft outside of the casing, an insulating bushing upon the shaft within the casing, a switch arm having a clamp embracing said bushing and insulated thereby from said shaft, a slab of insulating material mounted within the casing, contact members embedded in said slab flush therewith, and spring pressed contact plungers carried by said arm to bear against said slab and contact members.

In testimony that I claim the foregoing as my own, I have hereto affixed my signature in the presence of two witnesses.

FRANK GOFF.

Witnesses:
ALEXANDER H. GRISSOM,
WM. J. KAMINSKIE.